United States Patent [15] 3,645,796
Böhm et al. [45] Feb. 29, 1972

[54] ELECTROCHEMICAL CELL CONTAINING ELECTRICAL CONTACT AND METHOD OF USING

[72] Inventors: Harald Böhm, Oberursel; Joachim Heffler, Grossauheim, both of Germany

[73] Assignee: Licentia Patent-Verwaltungs-GmbH, Frankfurt am Main, Germany

[22] Filed: Dec. 18, 1969

[21] Appl. No.: 886,154

[30] Foreign Application Priority Data

Dec. 19, 1968 Germany .....................P 18 15 690.6

[52] U.S. Cl. ....................136/86 D, 136/120 FC, 204/290 R
[51] Int. Cl. ...........................................................H01m 27/00
[58] Field of Search..........................136/86, 120; 204/290 R

[56] References Cited

UNITED STATES PATENTS

| | | | |
|---|---|---|---|
| 3,276,909 | 10/1966 | Moos | 136/120 |
| 3,300,342 | 1/1967 | Klass | 136/86 |
| 3,324,025 | 6/1967 | Hackerman et al. | 136/86 |
| 3,346,421 | 10/1967 | Thompson et al. | 136/120 |

Primary Examiner—Winston A. Douglas
Assistant Examiner—H. A. Feeley
Attorney—Spencer and Kaye

[57] ABSTRACT

To prevent corrosion at the contact to a gas-diffusion electrode of an electrolytic cell, the electrode is provided on its gas-side with a hydrophobic porous coating of, for example, polytetrafluoroethylene and with a layer of graphite, tungsten carbide, or niobium silicide in conductive contact with the electrode.

9 Claims, 5 Drawing Figures

PATENTED FEB 29 1972 3,645,796

Inventors.
Harald Böhm
Joachim Heffler

BY Spencer & Kaye
ATTORNEYS.

ELECTROCHEMICAL CELL CONTAINING ELECTRICAL CONTACT AND METHOD OF USING

BACKGROUND OF THE INVENTION

The present invention relates to the electrical contacting of an electrode in an electrolytic cell, particularly that type of cell referred to as a "fuel" cell.

SUMMARY OF THE INVENTION

There is provided on the gas-side of a gas-diffusion electrode in an electrolytic cell a hydrophobic, porous coating and a layer of graphite, tungsten carbide, or niobium silicide in conductive contact with the electrode. Contact made to the electrode in this way does not corrode when using hydrogen as fuel with an acid electrolyte.

DESCRIPTION OF THE PREFERRED EMBODIMENTS

It has been determined that corrosion can occur at the contact to gas-diffusion electrodes using hydrogen as the gas to be oxidized and an acid electrolyte. Such corrosion eventually leads to a failure of the cell. This corrosion can be practically eliminated by contacting the electrode with tantalum or a noble metal, but such solutions of this problem are expensive. According to the present invention, corrosion is eliminated by contacting with electrolyte-impervious graphite, tungsten carbide, or niobium silicide. These materials of the invention have, when pure, resistivities of, respectively, 800 micro-ohm-cm., 22 micro-ohm-cm., and 12 micro-ohm-cm., which, when combined with their corrosion resistance, render them very suitable as contact materials.

Contact is effected on the gas side of the gas-diffusion electrode. In order that gas may diffuse through the remainder of the gas side, yet that electrolyte be prevented from seeping into the gas chamber, the remainder of the gas side is coated with a strongly hydrophobic, gas-porous substance, such as a gas-porous coating of polytetrafluoroethylene.

Figure 1:
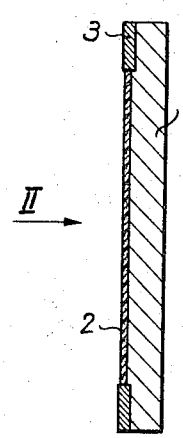
FIG. 1 is a sectional view of the contacted electrode of the invention, as viewed along the line 1—1 of FIG. 2.
Figure 2:
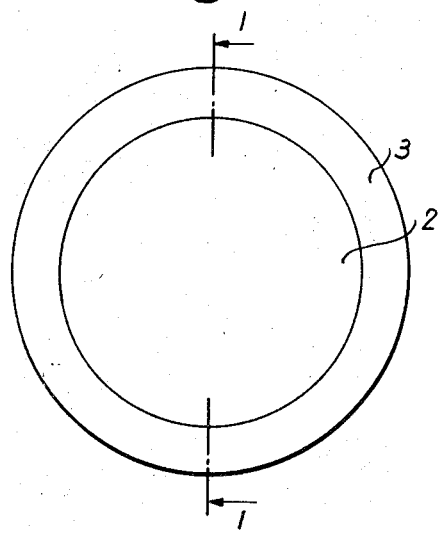
FIG. 2 is a view of the contacted electrode of the invention as seen in the direction of arrow II of FIG. 1.

The figures illustrate a preferred embodiment of the invention. Referring first to FIGS. 1 and 2, gas-diffusion electrode 1 is a porous disc of tungsten carbide. It may be prepared, for example, according to the process disclosed in the application of Harald Böhm et al. for an "Electrode Material," filed Nov. 28, 1969. Bonded to this electrode around its entire perimeter, preferably by thermoplastic islands as described in Example I below, is an annular ring 3 of graphite, tungsten carbide, or niobium silicide. The area within this ring 3 is covered by a coating 2 of hydrophobic, gas-porous substance.

Figure 3:
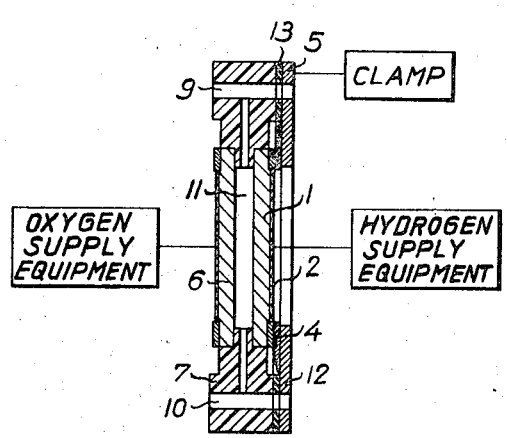
FIG. 3 is a view similar to that of FIG. 1 but containing additional structure.

Referring to FIG. 3, the electrode 1 of FIGS. 1 and 2 is shown assembled with other parts of a fuel cell. Electrode 6 is a porous carbon electrode, such as the active coal layer 8 disclosed in the application of Franz Pohl et al. U.S. Ser. No. 785,887, filed Dec. 23, 1968, now abandoned, but replaced by a streamlined continuation application Ser. No. 121,567 filed Mar. 5, 1971, for a "Fuel Cell." Electrode 6 is shown provided with a ring 3 and coating 2 of the types provided for electrode 1.

Both electrode 1 and electrode 6 are set into a plastic frame 7 which is electrically nonconductive and inert to the electrolyte that is to be used. The frame 7 is provided with conduit system 9 for electrolyte removal and conduit system 10 for electrolyte inflow. During operation of the cell, electrolyte is present in the electrolyte chamber 11 between the electrodes 1 and 6.

Oxygen and hydrogen supply equipment is provided, so that these gases may diffuse through electrodes 6 and 1, respectively, during operation of the cell. This equipment, which is conventional, has been illustrated by a labeled box since its detailed illustration is not essential for a proper understanding of the invention. Further details are shown in the above-referenced application of Franz Pohl et al.

The manner in which the electrodes are held in place in the frame is illustrated for electrode 1. An annular, conical plate spring 4 presses against ring 3. This spring 4 is made of a conductive material, such as steel (a corrodible material), and is shown in FIG. 4c of page 17, Vol. 13, McGraw-Hill Encyclopedia of Science and Technology, 1966, where it is called a Belleville spring. Backing up spring 4 is a steel ring 12 which may in turn abut against a terminal of a motor. During operation of the cell, current flow is by way of spring 4 to the load, for instance a motor. The pressure supplied to steel ring 12 may be supplied, for example, by a conventional clamp. This is illustrated by a labeled box in the drawing, since its detailed illustration is not essential for a proper understanding of the invention. Alternatively, the pressure may be supplied by the frame of another cell. The steel ring 12 bears against the frame 7 by way of an annular, rubber gasket 13. Holes are provided in the steel ring 12 for the conduit systems 9 and 10. A rubber tube (not shown) is inserted into the bores of these holes when the conduit systems are connected to, for example, an electrolyte circulating system, so that electrolyte does not contact the steel.

Since graphite, tungsten carbide, and niobium silicide do not have resistivities quite as low as some metals, the extending of ring 3 around the perimeter of disc 1 and the use of a Belleville spring increase the flow cross section for the electrical current to compensate for the higher resistivity, and this is thus a preferred execution of the invention. The gases come into the electrode centrally and are able to then diffuse throughout the electrode volume.

EXAMPLE I

Figure 4:
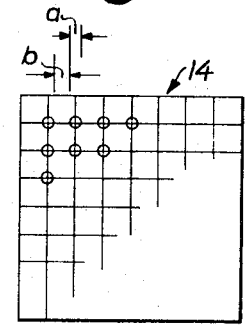
FIG. 4 is a plan view of a plate.
Figure 5:
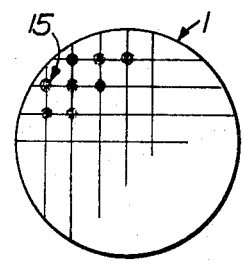
FIG. 5 is a plan view of a disc.

The tungsten carbide electrode of Example I of the application of Harald Bohm et al. filed Nov. 28, 1969, for an "Electrode Material" is provided as a disc having an outer diameter of 34 millimeters. Plate 14, which is provided with an array of holes (only 8 of which are shown in FIG. 4), is placed above one face of the disc, there being a space of about 2 millimeters between the bottom of the plate 14 and the top of the tungsten carbide disc. The holes of plate 14 are spaced from one another a distance $b=3$ millimeters and have a diameter $a$ of about 1.5 millimeters. Polyethylene powder having a particle size between 60 and 90 microns is placed on top of plate 14 and the plate is vibrated by an electromagnetic vibrator. As a result, the array of polyethylene islands 15 of FIG. 5 arises on the tungsten carbide disc. The islands are separated from one another and have diameters as determined primarily by the placement of the holes in plate 14. It has been found that the particular placement given above gives a satisfactory balancing of secure bonding and conductive contact between ring 3 and electrode 1. The amount of polyethylene applied amounts to 9 milligrams per square centimeter of disc surface.

The plate 14 is then removed from above the tungsten carbide disc and an annular piece of graphite foil having a thickness of 0.2 mm., a radial breadth of 4 mm., and an outer diameter of 34 mm. is laid onto the disc such that the circumference of the disc and the outer circumference of the graphite coincide. Onto the central portion of the disc that is still free, there is laid a 0.2 mm. thick disc of gas-porous polytetrafluoroethylene. The diameter of this teflon disc is 26 millimeters, so that it abuts against the inner diameter of the graphite foil.

The resulting assembly is clamped between two glass plates with a pressure of 55 ponds (the unit force in the c.g.s. system of units) per cm.$^2$ and placed in an oven at 140° C. for 45 minutes under an atmosphere of 96 percent by volume argon and 4 percent by volume hydrogen. Upon removal from the oven, there results a secure bonding of teflon and graphite to the tungsten carbide disc by way of the thermoplastic islands 15.

The annular piece of graphite is made by blanking from a piece of commercially available graphite paper leaving a resistivity of $2 \times 10^{-3}$ ohm centimeters.

The assembly of tungsten carbide disc, Teflon, and graphite is clamped into frame 7 as shown in FIG. 3. The force of the Belleville spring 4 on the graphite is 1 kilopond and the internal diameter of the spring is 28 millimeters. This bias force is transmitted to the electrode 1 and helps to assure good conductive abutment between the graphite and the tungsten carbide.

With oxygen and hydrogen gas pressures each at 150 millimeters of water, electrode thickness of 3 mm., 2 normal $H_2SO_4$ as electrolyte, and a temperature of 60° C., the electrical power achieved is 10 milliwatts per square centimeter. After 1,000 hours of operation, the contact to electrode 1 through graphite ring 3, spring 4 and ring 12 was corrosing free and without defect.

EXAMPLE II

One proceeds as in example I, except that, in place of the graphite foil, a 0.2 mm. thick tungsten carbide foil is used. This tungsten carbide foil is prepared by mixing tungsten carbide powder of 1 micron particle size with teflon suspension to obtain proportions of 85 weight percent tungsten carbide and 15 weight teflon (polytetrafluoroethylene). After drying, this mixture is compacted at a pressure of $4 \times 10^6$ ponds per square centimeter and sintered in an atmosphere of argon with 4 percent by volume hydrogen at a sintering temperature of 320° C. The resistivity of this foil is 10 milliohm centimeters.

EXAMPLE III

One proceeds as in Examples I and II, except that the tungsten carbide of Example II is replaced by niobium silicide of 2.5 micron particle size.

It will be understood that the above description of the present invention is susceptible to various modifications, changes and adaptations, and the same are intended to be comprehended within the meaning and range of equivalents of the appended claims.

We claim:
1. In an electrochemical cell, an electrode-contact combination comprising:
   a. a gas-diffusion electrode having a side intended to be contacted by gas in said electrochemical cell, opposite to a side intended to be contacted by electrolyte;
   b. a layer of electrolyte-impervious electrically conductive material situated on a portion of said gas side around the entire perimeter of said electrode and in conductive abutment with said electrode, said material selected from the group consisting of graphite, tungsten carbide, and niobium silicide,
   c. a hydrophobic, porous coating bonded to the remainder of said gas side, and
   d. corrodible spring means pressing against said electrolyte-impervious electrically conductive material.
2. A combination as claimed in claim 1, further comprising: means for introducing gas to said gas side; and electrolyte contacting said opposite side.
3. A combination as claimed in claim 2, further comprising thermoplastic islands bonded between said layer of electrically conductive material and said electrode.
4. A combination as claimed in claim 2, said layer of electrically conductive material consisting essentially of a bonded mixture of the powder of a material selected from the group consisting of graphite, tungsten carbide, and niobium silicide with powdered plastic.
5. A combination as claimed in claim 2, said hydrophobic, porous coating being polytetrafluoroethylene.
6. A combination as claimed in claim 2, current flow during cell operation being by way of said spring means.
7. A combination as claimed in claim 2, said portion being annular, said spring means being a Belleville spring.
8. A combination as claimed in claim 2, said electrolyte being acidic.
9. A method of using the combination as claimed in claim 1, comprising contacting said gas side with gas in a gas chamber and said electrolyte side with electrolyte in an electrolyte chamber, the conditions being such that electrolyte would seep into said gas chamber but for the presence of said layer and said coating.

* * * * *